3,063,968
POLYMERIZATION OF 2-p-DIOXANONE
Herman S. Schultz, Easton, Pa., assignor to General Aniline & Film Corporation, New York, N.Y., a corporation of Delaware
No Drawing. Filed June 15, 1960, Ser. No. 36,179
18 Claims. (Cl. 260—78.3)

This invention relates to new and useful polymeric materials, and in particular to polymers derived from 2-p-dioxanone which are outstandingly useful as coatings, films, textile fibers, molding powders and the like, and to the methods for the preparation of such polymeric materials.

The compound 2-p-dioxanone which has the formula:

which is a cyclic ester or lactone which is old and well known but for which uses have been long wanting. The compound may be prepared by numerous methods among which cyclization of diethylene glycol is probably the most well known. One of the serious obstacles to the development of uses for dioxanone lies in the property of this compound to undergo polymerization, and often spontaneous polymerization to low molecular weight products which have not been deemed useful for any purpose. As a matter of fact, much effort has been expanded in attempting to forestall this spontaneous polymerization by such techniques as ring substitution. All attempts to obtain useful polymers from dioxanone have been fruitless. Products having molecular weights of the order of 1200 to 1300 have been reported but such low molecular weight materials are worthless as film formers and precursers for fibers. Polymerizations employing various catalysts have been tried but none has achieved a product of a molecular weight more than about 2500, and again, such products are completely unsuitable as film formers, and especially for the manufacture of textile fibers. The thermal polymerization of the compound has failed to yield any product above a molecular weight of about 2000. Again, this is completely unsatisfactory.

From a careful review of the work of W. H. Carothers, especially as set out in his collected papers on high polymeric substances published in 1940 by the Interscience Publishers, Inc. of New York, one could hardly expect a six-member lactone to form a useful high molecular weight polymer product. Various methods have been proposed for the polymerization of seven- and eight-membered lactone wherein the reaction is made to go to successful polymer formation by the use of selected catalytic agents. None of such catalysts, however, has been successful in obtaining any useful polymeric material from dioxanone.

It is therefore an object of this invention to provide new and useful polymers derived from 2-p-dioxanone.

It is still another object of this invention to provide new and useful polymers of 2-p-dioxanone which yield satisfactory fiber diagrams in a stretched condition.

It is still another object of this invention to provide polymers of 2-p-dioxanone which exhibit the characteristic of molecular orientation.

It is still another object of this invention to provide processes for the preparation of polymers from 2-p-dioxanone which yield X-ray fiber diagrams in the stretched condition.

It is still another object of this invention to provide processes for the preparation of polydioxanone which polymer is characterized by being capable of being molecularly oriented.

It is still a further object of this invention to provide films, fibers and molding powders of poly-2-p-dioxanone of greatly increased molecular weight and methods for making same.

It is still another object of this invention to provide processes whereby 2-p-dioxanone may be polymerized to a high molecular weight product suitable for use in the manufacture of textile fibers.

Other objects will appear hereinafter as the description proceeds.

As pointed out above, all previous attempts to polymerize 2-p-dioxanone to form linear superpolymers suitable for the preparation of films and fibers have failed. The catalysts heretofore employed in lactone polymers have failed to yield any useful products of 2-p-dioxanone. Such catalysts include sulfuric acid, sodium hydride, boron trifluoride, benzoyl peroxide, powdered sodium hydroxide, powdered lithium hydroxide, phosphorous pentoxide, 85% phosphoric acid, 99% phosphoric acid, aluminum chloride, tri-isopropoxy aluminum, and methyl borate.

It has now been discovered that by the employment of a specific type of organo-metallic compounds, polymers from 2-p-dioxanone are obtainable which polymers are capable of being oriented to yield, among other forms, textile fibers which exhibit the characteristic X-ray fiber diagram when in stretched condition. The organo-metallic compounds which are herein contemplated are characterized by the following general formula:

wherein R is an alkyl, aralkyl or aryl radical; $n$ is an integer from 1 to 2, inclusive; $m$ is a metal of the group IIB metals of the periodic table and includes: zinc, cadmium and mercury; R' may be hydrogen, halogen, hydroxy, alkoxy, aryloxy, and acyloxy; $m$ is 0 or 1; and $n+m$ equals 2. The preferred organo-metallic compounds are those wherein R' is hydrogen, alkoxy, aryloxy, or any combination of these. Suitable compounds within the above generic formula include the following:

Methyl zinc chloride
Ethyl zinc chloride
Propyl zinc chloride
Methyl methoxy zinc
Ethyl ethoxy zinc
n-Propyl ethoxy zinc
Diphenyl zinc
Methyl phenyl zinc
Methyl phenoxy zinc
Ethyl acetoxy zinc
Diphenyl mercury
Diethyl mercury
Di-n-propyl mercury
Di-n-propyl cadmium
n-Propyl-n-propoxy cadmium
Diethyl zinc
Di-n-propyl zinc
Diethyl cadmium
Di-n-propyl cadmium
Di-n-amyl mercury
Dibenzyl mercury
Dinaphthyl mercury
Di-o-tolyl zinc
Di-n-butyl zinc
n-Butyl isobutyl zinc
n-Butyl isobutoxy zinc
n-Butyl ethoxy zinc
n-Butyl ethoxy cadmium
n-Butyl isobutoxy cadmium
n-Amyl, n-amoxy zinc
n-Amyl, n-amoxy cadmium
n-Amyl, n-amoxy mercury In addition to the individual components, it is of course obvious that mixtures of the above catalysts may be employed with equal facility. The amount of catalyst to be employed should of course be sufficient to effect polymerization within a reasonable time. In practice it has been that as little as 0.001% by weight of the 2-p-dioxanone results in the polymer formation within several hours. The amount of catalyst necessary is also related to the purity of the 2-p-dioxanone, and consequently with the purest samples of monomer, less catalyst is necessary. The upper limit of catalyst is not critical but it is found that no useful purpose appears to be served by employing more than 5% based on the weight of the monomer. The preferred range of catalyst lies between about 0.01% and 1% by weight based on the weight of the monomer.

The polymerization of the 2-p-dioxanone may be carried out either in bulk or in a liquid suspending medium which may be a solvent for the dioxanone, or merely act as a suspending medium therefor. Suitable solvents for 2-p-dioxanone which may be used in the polymerization procedure include the following: benzene, toluene, xylene, dioxane, diethyl ether, chloroform, tetrahydrofurane, and the like. It will be noted that dioxanone is soluble in a great variety of organic liquids and any of these is suitable for the polymerization procedure. Non-solvents for this compound include the aliphatic hydrocarbons such as n-heptane, the hexanes and the aliphatic petroleum ethers. Where a solvent is used, the concentration of dioxanone may be any selected concentration although it is preferred to employ solutions from about 25% to 70% concentration. The polymerization procedure in most instances initiates at room temperature with the aforementioned type of catalyst and proceeds usually as a slightly exothermic type of reaction. Much lower temperatures as well as more elevated temperatures may be used, however, without detracting from the utility of the polymerization procedure. Thus one may use temperatures as low as −20° C. at the low end and as high as 150° C. at the upper end. The preferred temperature range lies between about 10° C. and 80° C.

Viscosities are determined at 25° C. using an Ubbelohde viscometer and tetrachloroethane as a solvent. $\eta_{inh}$ is $(\ln \eta_r)/c$ where $\eta_{inh}$ is the inherent viscosity, $\eta_r$ is the relative viscosity, and $c$ is the concentration in grams per 100 ml. solvent. The exact term, $c$ refers to grams/100 ml. solution but the above is a convenient close approximation. Intrinsic viscosity, $[\eta]$, is defined as $$[\eta] = \frac{\eta_r - 1}{c} = \frac{(\ln \eta_r)}{c} \lim c \to 0$$

These terms are used in the following examples.

The following examples will serve to illustrate the present invention without being deemed limitative thereof, and in these examples parts by weight are intended unless otherwise indicated.

Example 1

All of the procedures in this example as well as in those which follow are carried out in a "dry box" or "glove box" containing a nitrogen atmosphere in order to have conditions which are both anhydrous and anaerobic. An hypodermic syringe technique is used to transfer the catalyst in the box. A specially cleaned and nitrogen purged screw-top bottle with a polyethylene liner is used as the reaction vessel.

To 59.9 g. (0.587 mole) of 2-p-dioxanone which has been previously distilled under nitrogen there is added at room temperature (25° C.) 0.5 cc. of a solution of diethyl zinc (25% by weight of diethyl zinc in heptane). Within fifteen minutes, the contents of the bottle increase in viscosity, and in another half hour the contents thereof are gelled and warm to the touch. After an additional two hours, the contents are observed to be a hard, white polymer material. The reaction product in the bottle is then permitted to stand over night and thereafter the said product, in apparently quantitive yield, is broken out from the cracked bottle in one piece. The inherent viscosity for a solution containing 0.5 g. of polymer per 100 cc. of tetrachloroethane is 2.83. The intrinsic viscosity is found to be 3.40. A capillary melting point determination yields a value of 105° C. to 106° C., and this is taken as the temperature at which a sliver in the capillary is completely clear and transparent. A sample of the product is then used to prepare films in a Carver press, and such films, when prepared, are found to have a tensile strength of 6,980 p.s.i. and an ultimate tensile strength of 22,700 p.s.i. as measured on an Instron machine. Elongation during these measurements takes place from 1 inch to 8.71 inches with necking down. The product forms tough, resilient films and monofilaments which can be cold drawn to tough clear films and monofilaments. The unstretched films show a distinct crystalline structure under X-ray diffraction observation but crystallinity is of the random type. The stretched films give a distinct X-ray diffraction pattern characteristic of oriented crystalline material. The softening range of the product as determined on a Mannheim block is 97° C. to 114° C. Monofilaments may be formed from the hot metal at 150° C. or from a solution in a suitable solvent such as tetrachloroethane. The polymer product is chemically resistant to absolute ethanol, acetone, ethyl acetate, ethylene dichloride, carbon tetrachloride, toluene, n-heptane, 10% aqueous sodium chloride solution and distilled water. The polymer dissolves in 30% sulfuric acid, 10% aqueous sodium hydroxide, tetrachloroethane and cresols.

Example 2

The techniques employed in this example are similar to the ones employed in Example 1. To 59.9 g. of 2-p-dioxanone which has been distilled under nitrogen there is added at room temperature 0.5 cc. of a solution of diethyl cadmium (25% by weight in heptane). The contents of the reaction vessel become gelled, opaque and hot to the touch within ten minutes. One-half hour later the product in the reaction vessel is an opaque, firm, solid polymer and the reaction vessel is uncomfortably hot to the touch. The conversion to the polymer is apparently 100%, and after removal from the reaction vessel, the product is found to possess the following characteristics:

| | |
|---|---|
| Capillary melting point °C | 103 |
| Softening temperature on a Mannheim block °C | 106 |
| Inherent viscosity (0.5 g. polymer per 100 cc. tetrachloroethane | 1.98 |
| Intrinsic viscosity | 2.22 |

The film and filament forming properties of the polymer are similar to those of Example 1 as well as the solvent properties thereof. The tensile strength and ultimate tensile strength of films prepared in the manner described in Example 1 are 7,050 p.s.i. and 23,900 p.s.i., respectively. Elongation takes place from one inch to 10.1 inches.

Example 3

The procedure of Example 1 is again repeated except that in lieu of diethyl zinc, an equal weight of diethyl mercury is employed. A similar polymer product is produced.

Examples 4–8

In the following examples the procedure of Example 1 is repeated employing the indicated amounts of the recited catalysts by weight based on the weight of the 2-p-dioxanone.

| Example | Catalyst |
|---|---|
| 4 | 0.002% diphenyl zinc. |
| 5 | 0.002% methylphenyl zinc. |
| 6 | 0.002% methylmethoxy zinc. |
| 7 | 0.002% di-n-propyl cadmium. |
| 8 | 0.002% ethyl acetoxy zinc. |

In each instance, polymer product is obtained of substantially the same characteristics as the product of Example 1.

Example 9

The procedure of Examples 4 through 8 are repeated employing, however, catalyst concentrations of 0.01%, 0.05%, 0.1%, 0.5% and 1%. In each instance, polymer product is obtained.

Example 10

Example 1 is once again repeated except that in addition to the 2-p-dioxanone there is also present in the reaction vessel 100 g. of purified n-heptane. The dioxanone is not soluble in the heptane but remains dispersed therethrough upon vigorous stirring. After stirring for ten minutes, an additional 1 cc. of catalyst is added and the temperature of the reactants is raised to 45° C. by heating. Within one-half hour there appears a dispersion of solid material in the heptane. The solid mass is removed from the heptane diluent and desiccated in a vacuum to remove the last traces of the heptane. Films and fibers may be formed from this product.

Example 11

The procedure of Example 1 is repeated except that 0.2 cc. of the diethyl zinc solution is used instead of 0.5 cc. as in Example 1. A capillary melting point of 128° C. is obtained. The other properties are similar to those of Example 1.

Other variations in and modifications of the described processes which will be obvious to those skilled in the art can be made in this invention without departing from the scope or spirit thereof.

I claim:

1. The method which compromises polymerizing 2-p-dioxanone with a polymerization catalyst having the formula:

$$[R]_n-M-[R']_m$$

wherein R is a radical selected from the group consisting of alkyl, aryl and aralkyl radicals, R' is a radical selected from the group consisting of hydrogen, halogen, hydroxy, alkoxy, aryloxy, and acyloxy radicals, $n$ is an integer from 1 to 2, $m$ equals 0 to 1, $n+m$ equals 2, and M is a metal of the group IIB metals of the periodic table of elements.

2. The method which comprises polymerizing 2-p-dioxanone with a polymerization catalyst having the formula:

$$[R]_n-M-[R']_m$$

wherein R is a radical selected from the group consisting of alkyl, aryl and aralkyl radicals, R' is a radical selected from the group consisting of hydrogen, halogen, hydroxy, alkoxy, aryloxy, and acyloxy radicals, $n$ is an integer from 1 to 2, $m$ equals 0 to 1, $n+m$ equals 2, and M is zinc.

3. The method which comprises polymerizing 2-p-dioxanone with a polymerization catalyst having the formula:

$$[R]_n-M-[R']_m$$

wherein R is a radical selected from the group consisting of alkyl, aryl and aralkyl radicals, R' is a radical selected from the group consisting of hydrogen, halogen, hydroxy, alkoxy, aryloxy, and acyloxy radicals, $n$ is an integer from 1 to 2, $m$ equals 0 to 1, $n+m$ equals 2, and M is cadmium.

4. The method which comprises polymerizing 2-p-dioxanone with a polymerization catalyst having the formula:

$$[R]_n-M-[R']_m$$

wherein R is a radical selected from the group consisting of alkyl, aryl and aralkyl radicals, R' is a radical selected from the group consisting of hydrogen, halogen, hydroxy, alkoxy, aryloxy, and acyloxy radicals, $n$ is an integer from 1 to 2, $m$ equals 0 to 1, $n+m$ equals 2, and M is mercury.

5. The method which comprises polymerizing 2-p-dioxanone with a zinc alkyl catalyst.

6. The method which comprises polymerizing 2-p-dioxanone with a cadmium alkyl catalyst.

7. The method which comprises polymerizing 2-p-dioxanone with a mercury alkyl catalyst.

8. The method which comprises polymerizing 2-p-dioxanone with diethyl zinc.

9. The method which comprises polymerizing 2-p-dioxanone with diethyl cadmium.

10. The method which comprises polymerizing 2-p-dioxanone with diethyl mercury.

11. The method which comprises polymerizing 2-p-dioxanone with from about 0.001% to about 5% by weight based on the weight of the 2-p-dioxanone of a polymerization catalyst having the formula:

$$[R]_n-M-[R']_m$$

wherein R is a radical selected from the group consisting of alkyl, aryl and aralkyl radicals, R' is a radical selected from the group consisting of hydrogen, halogen, hydroxy, alkoxy, aryloxy, and acyloxy radicals, $n$ is an integer from 1 to 2, $m$ equals 0 to 1, $n+m$ equals 2, and M is a metal of the group IIB metals of the periodic table of elements.

12. The method which comprises polymerizing 2-p-dioxanone at a temperature of from about −20° C. to about 150° C. with from about 0.001% to about 5% by weight based on the weight of the 2-p-dioxanone of a polymerization catalyst having the formula:

$$[R]_n-M-[R']_m$$

wherein R is a radical selected from the group consisting of alkyl, aryl and aralkyl radicals, R' is a radical selected from the group consisting of hydrogen, halogen, hydroxy, alkoxy, aryloxy, and acyloxy radicals, $n$ is an integer from 1 to 2, $m$ equals 0 to 1, $n+m$ equals 2, and M is a metal of the group IIB metals of the periodic table of elements.

13. The method which comprises polymerizing 2-p-dioxanone with from about 0.01% to about 1% by weight based on the weight of the 2-p-dioxanone of a polymerization catalyst having the formula:

$$[R]_n-M-[R']_m$$

wherein R is a radical selected from the group consisting of alkyl, aryl and aralkyl radicals, R' is a radical selected from the group consisting of hydrogen, halogen, hydroxy, alkoxy, aryloxy, and acyloxy radicals, $n$ is an integer from 1 to 2, $m$ equals 0 to 1, $n+m$ equals 2, and M is a metal of the group IIB metals of the periodic table of elements.

14. The method which comprises polymerizing 2-p-dioxanone at a temperature of from about 10° C. to about 80° C. with from about 0.01% to about 1% by weight based on the weight of the 2-p-dioxanone of a polymerization catalyst having the formula:

$$[R]_n-M-[R']_m$$

wherein R is a radical selected from the group consisting of alkyl, aryl and aralkyl radicals, R' is a radical selected from the group consisting of hydrogen, halogen, hydroxy, alkoxy, aryloxy, and acyloxy radicals, $n$ is an integer from 1 to 2, $m$ equals 0 to 1, $n+m$ equals 2, and M is a metal of the group IIB metals of the periodic table of elements.

15. The method which comprises polymerizing 2-p-dioxanone at a temperature of from about −20° C. to about 150° C. with from about 0.001% to about 5% by weight based on the weight of the 2-p-dioxanone of a dialkyl zinc catalyst.

16. The method which comprises polymerizing 2-p-dioxanone at a temperature of from about −20° C. to about 150° C. with from about 0.001% to about 5% by weight based on the weight of the 2-p-dioxanone of a dialkyl cadmium catalyst.

17. The method which comprises polymerizing 2-p-dioxanone at a temperature of from about −20° C. to about 150° C. with from about 0.001% to about 5% by weight based on the weight of the 2-p-dioxanone of a dialkyl mercury catalyst.

18. The method which comprises polymerizing 2-p-dioxanone at about room temperature with about 0.002% by weight based on the weight of the 2-p-dioxanone of diethyl zinc.

References Cited in the file of this patent

UNITED STATES PATENTS

| | | |
|---|---|---|
| 2,163,109 | Spanagel | June 20, 1939 |
| 2,808,390 | Caldwell | Oct. 1, 1957 |

OTHER REFERENCES

Carothers: Collected Papers, Interscience (1940), pages 141, 143, 144, 151.